(12) United States Patent
Matsushima

(10) Patent No.: US 11,860,488 B2
(45) Date of Patent: Jan. 2, 2024

(54) DISPLAY APPARATUS INCLUDING A DISPLAY PANEL AND A BACKLIGHT UNIT

(71) Applicant: Japan Display Inc., Tokyo (JP)

(72) Inventor: Toshiharu Matsushima, Tokyo (JP)

(73) Assignee: Japan Display Inc., Tokyo (JP)

( * ) Notice: Subject to any disclaimer, the term of this patent is extended or adjusted under 35 U.S.C. 154(b) by 7 days.

(21) Appl. No.: 17/655,261

(22) Filed: Mar. 17, 2022

(65) Prior Publication Data

US 2022/0206334 A1    Jun. 30, 2022

Related U.S. Application Data

(63) Continuation of application No. PCT/JP2020/030446, filed on Aug. 7, 2020.

(30) Foreign Application Priority Data

Sep. 20, 2019  (JP) ................................ 2019-171808

(51) Int. Cl.
*G02F 1/1343* (2006.01)
*G02F 1/1335* (2006.01)
(Continued)

(52) U.S. Cl.
CPC ..... *G02F 1/134372* (2021.01); *G02B 6/0038* (2013.01); *G02F 1/133524* (2013.01);
(Continued)

(58) Field of Classification Search
CPC ......... G02F 1/134372; G02F 1/133615; G02F 1/133524; G02F 1/133526; G02B 6/0038
See application file for complete search history.

(56) References Cited

U.S. PATENT DOCUMENTS

2006/0077688 A1    4/2006 Uehara et al.
2007/0069978 A1    3/2007 Daiku
(Continued)

FOREIGN PATENT DOCUMENTS

JP    2006-140125 A    6/2006
JP    2007-65380 A    3/2007
(Continued)

OTHER PUBLICATIONS

International Search Report dated Oct. 27, 2020 in PCT/JP2020/030446, filed on Aug. 7, 2020, 2 pages.
(Continued)

*Primary Examiner* — Paisley L Wilson
(74) *Attorney, Agent, or Firm* — Maier & Maier, PLLC

(57) ABSTRACT

A display panel and a backlight unit facing the display panel are provided. The display panel includes first and second polarizing plates, first and second substrates, and a liquid crystal layer. In a plan view, a second electrode formed on the first substrate extends in a first direction and includes a plurality of branch electrodes arranged in a second direction crossing the first direction. Any one of transmission axes of the first and second polarizing plates is parallel to an orientation direction of liquid crystal molecules when no voltage is applied to the second electrode. When a formation surface of the second electrode is as a base level and a normal direction of the base level is set to 0 degrees, light from the backlight unit has a peak of the intensity of light at an angle different from 0 degrees in a visible light region.

20 Claims, 9 Drawing Sheets

(51) Int. Cl.
  *G02F 1/13357* (2006.01)
  *F21V 8/00* (2006.01)
(52) U.S. Cl.
  CPC .. *G02F 1/133526* (2013.01); *G02F 1/133528* (2013.01); *G02F 1/133553* (2013.01); *G02F 1/133615* (2013.01); *G02F 1/134336* (2013.01)

(56) References Cited

U.S. PATENT DOCUMENTS

| | | |
|---|---|---|
| 2009/0109372 A1 | 4/2009 | Lee et al. |
| 2011/0149391 A1 | 6/2011 | Brott et al. |
| 2014/0354931 A1 | 12/2014 | Kurasawa et al. |
| 2015/0029442 A1 | 1/2015 | Koike et al. |
| 2016/0062191 A1 | 3/2016 | Matsushima |

FOREIGN PATENT DOCUMENTS

| | | | |
|---|---|---|---|
| JP | 2007-94035 A | | 4/2007 |
| JP | 2009210673 A | * | 9/2009 |
| JP | 2013-515277 A | | 5/2013 |
| JP | 2013-190778 A | | 9/2013 |
| JP | 2014-232136 A | | 12/2014 |
| JP | 2016-48276 A | | 4/2016 |

OTHER PUBLICATIONS

Office Action dated Jun. 27, 2023, in corresponding Japanese Application No. 2019-171808, 9 pages.

* cited by examiner

DISPLAY APPARATUS INCLUDING A DISPLAY PANEL AND A BACKLIGHT UNIT

CROSS-REFERENCE TO RELATED APPLICATION

The present application is a continuation of International Application No. PCT/JP2020/030446 filed on Aug. 7, 2020 and claims priority to Japanese Patent Application No. 2019-171808 filed on Sep. 20, 2019, the disclosure of which is incorporated herein by reference.

TECHNICAL FIELD OF THE INVENTION

The present invention relates to a display apparatus, and more particularly, the present invention relates to a liquid crystal display apparatus having a diffraction grating function provided with a liquid crystal layer capable of controlling an emission direction of light by applying a voltage to electrodes.

BACKGROUND OF THE INVENTION

Patent Document 1 (Japanese Patent Application Publication No. 2016-48276) and Patent Document 2 (Japanese Patent Application Publication No. 2014-232136) describe that a liquid crystal display apparatus driven in a transverse electric field mode has a structure in which one of electrodes forming an electric field is formed in a comb tooth.

Patent Document 3 (Japanese Patent Application Publication No. 2013-515277) and Patent Document 4 (Japanese Patent Application Publication No. 2007-94035) describe a display apparatus configured to display a three-dimensional image. Patent Documents 3 and 4 describe a driving method of displaying an image for the right eye and an image for the left eye by alternately emitting first light and second light.

SUMMARY OF THE INVENTION

In case of a display apparatus having a display panel provided with a liquid crystal layer, an electric field is applied to the liquid crystal layer to control orientation of liquid crystal molecules. In a driving method called a transverse electric field mode, by causing an electrode located closer to a liquid crystal layer of a pixel electrode and a common electrode to which an electric field is applied to have a comb-shaped electrode structure, it is possible to improve a response speed for controlling a rotational direction of liquid crystal molecules. However, in case of the display apparatus having the above structure, it was found that there is room for improvement in terms of contrast of a displayed image.

The other object and new feature will become apparent from description of the present specification and the accompanying drawings.

A display apparatus according to one embodiment includes: a display panel; and a light supplying unit facing the display panel and configured to emit visible light to the display panel. The display panel includes a first polarizing plate, a first substrate, a liquid crystal layer, a second substrate, and a second polarizing plate, which are laminated on a facing surface of the light supplying unit with respect to the display panel. The first substrate has a first electrode and a second electrode formed on a layer different from that of the first electrode. In a plan view, the second electrode extends in a first direction and includes a plurality of branch electrodes arranged in a second direction orthogonal to the first direction. A transmission axis of the first polarizing plate and a transmission axis of the second polarizing plate are orthogonal to each other, and any one of the transmission axis of the first polarizing plate and the transmission axis of the second polarizing plate is parallel to an orientation direction of liquid crystal molecules when no voltage is applied to the second electrode. When a formation surface of the second electrode is used as a base level and a normal direction of the base level is set to 0 degrees, light supplied from the light supplying unit has a peak of the intensity of light at an angle different from 0 degrees in a visible light region.

BRIEF DESCRIPTIONS OF THE DRAWINGS

DESCRIPTIONS OF EMBODIMENTS

Figure 1:
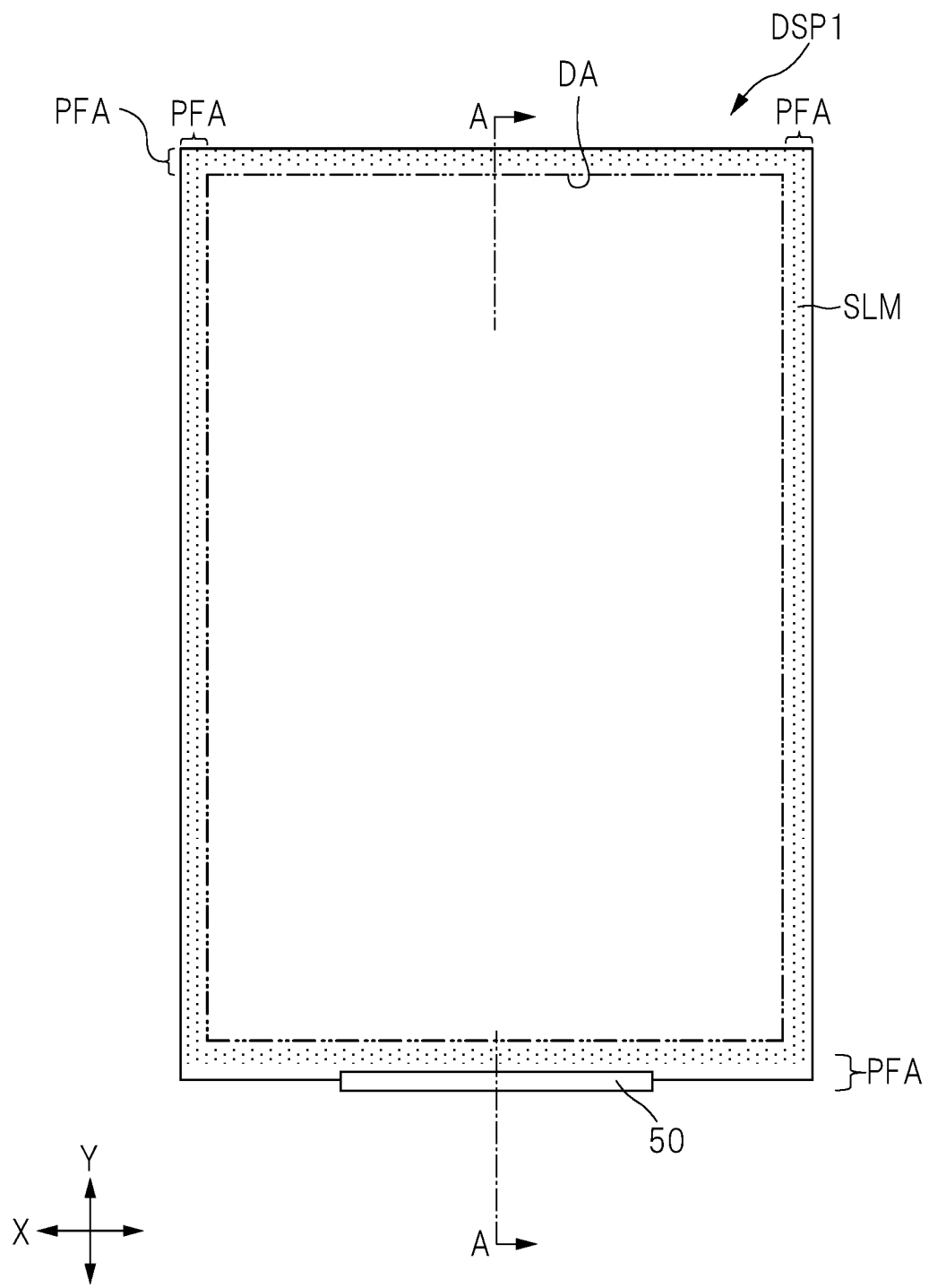
FIG. 1 is a plan view of a display surface side illustrating one example of a display apparatus according to an embodiment.

Hereinafter, each embodiment of the present invention will be described with reference to the drawings. This disclosure is an example only and suitable modifications which can be easily conceived by a person having ordinary skill in the art without departing from the gist of the present invention are included within the scope of the present invention as a matter of course. In addition, in order to further clarify the description, a width, a thickness, a shape, or the like of respective portions may be schematically illustrated in the drawings compared with actual forms, but the drawings are examples only and do not limit the interpretation of the present invention. In addition, in this specification and the respective drawings, the same components described in the drawings which have been described before are denoted by the same or related reference numerals, and detailed description thereof may be omitted as needed.

Note that an X direction and a Y direction, which will be described in the present application, are orthogonal to each other, and a plane consisting of the X direction and the Y direction (an X-Y plane) is a horizontal plane. Further, a Z direction is orthogonal to the X direction and the Y direction, and is a vertical direction perpendicular to the horizontal plane described above. In the Z direction may be described as a thickness direction of a certain structure.

Further, in the drawings used in the embodiment, in order to easily view the drawings, hatching may be omitted even in sectional views, and hatching may be added even in plan views.

<Display Apparatus>

Figure 2:
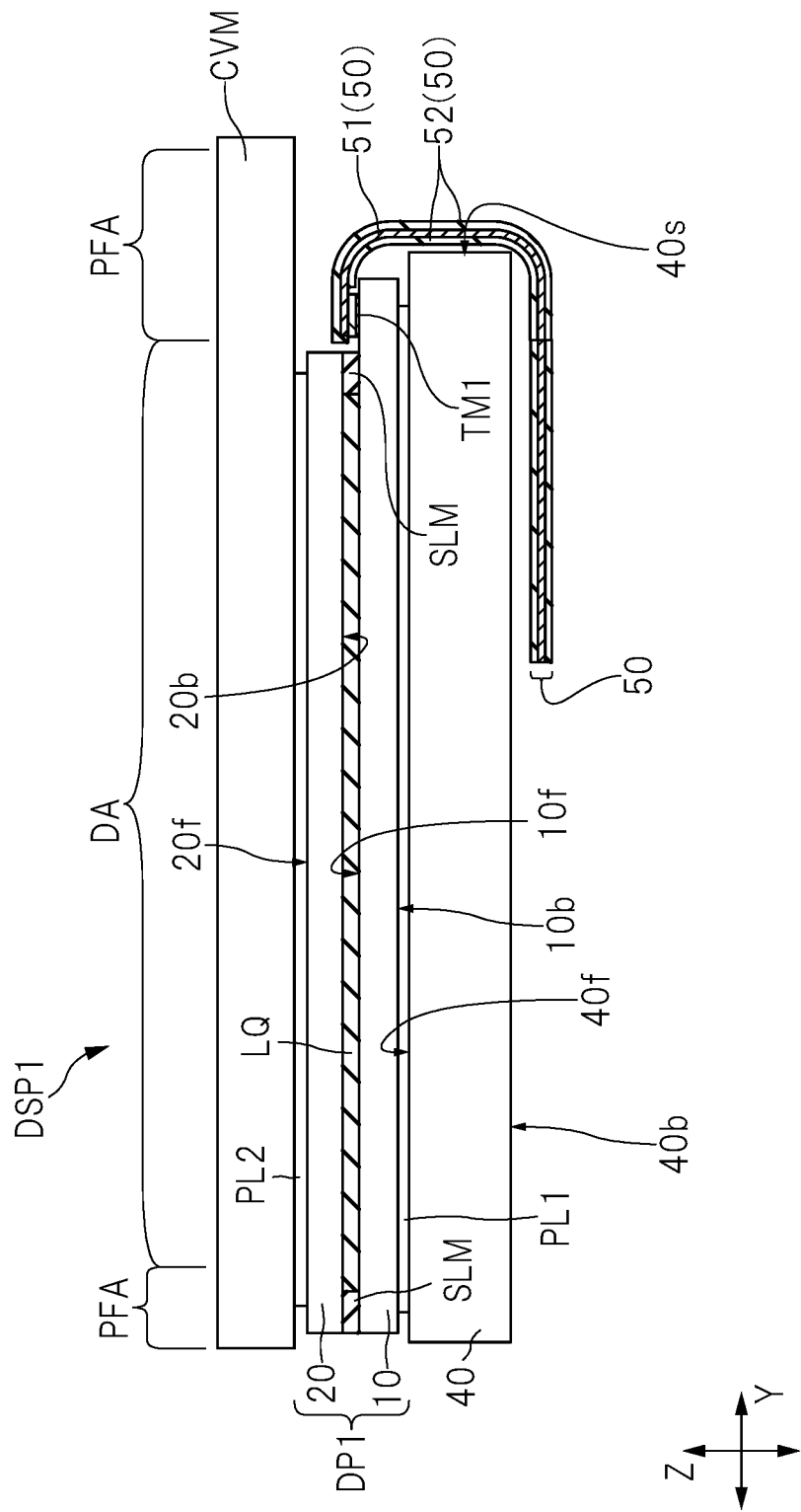
FIG. 2 is a sectional view taken along an A-A line of FIG. 1.
Figure 3:
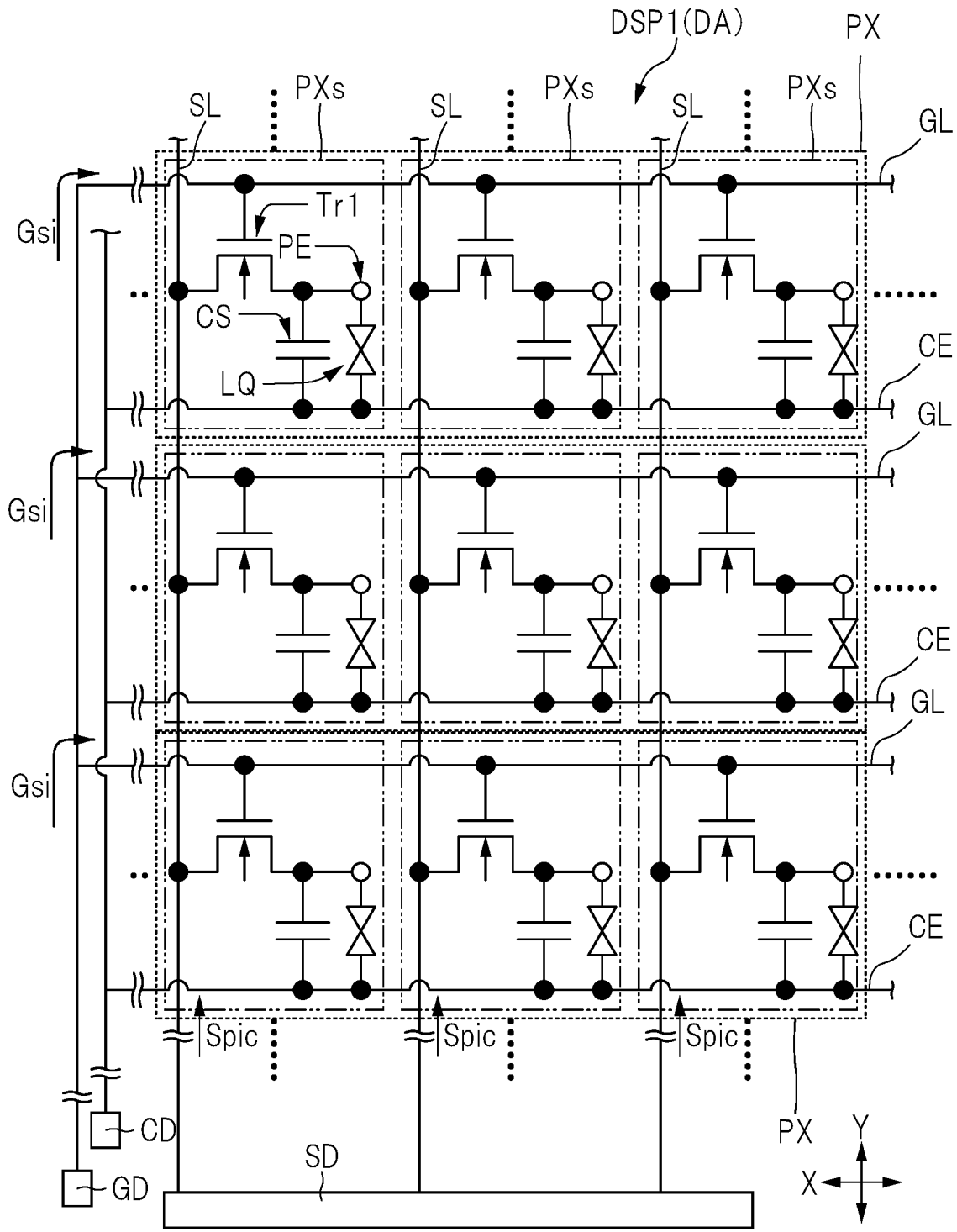
FIG. 3 is a circuit diagram illustrating a circuit configuration example around pixels included in the display apparatus illustrated in FIG. 1.
Figure 4:
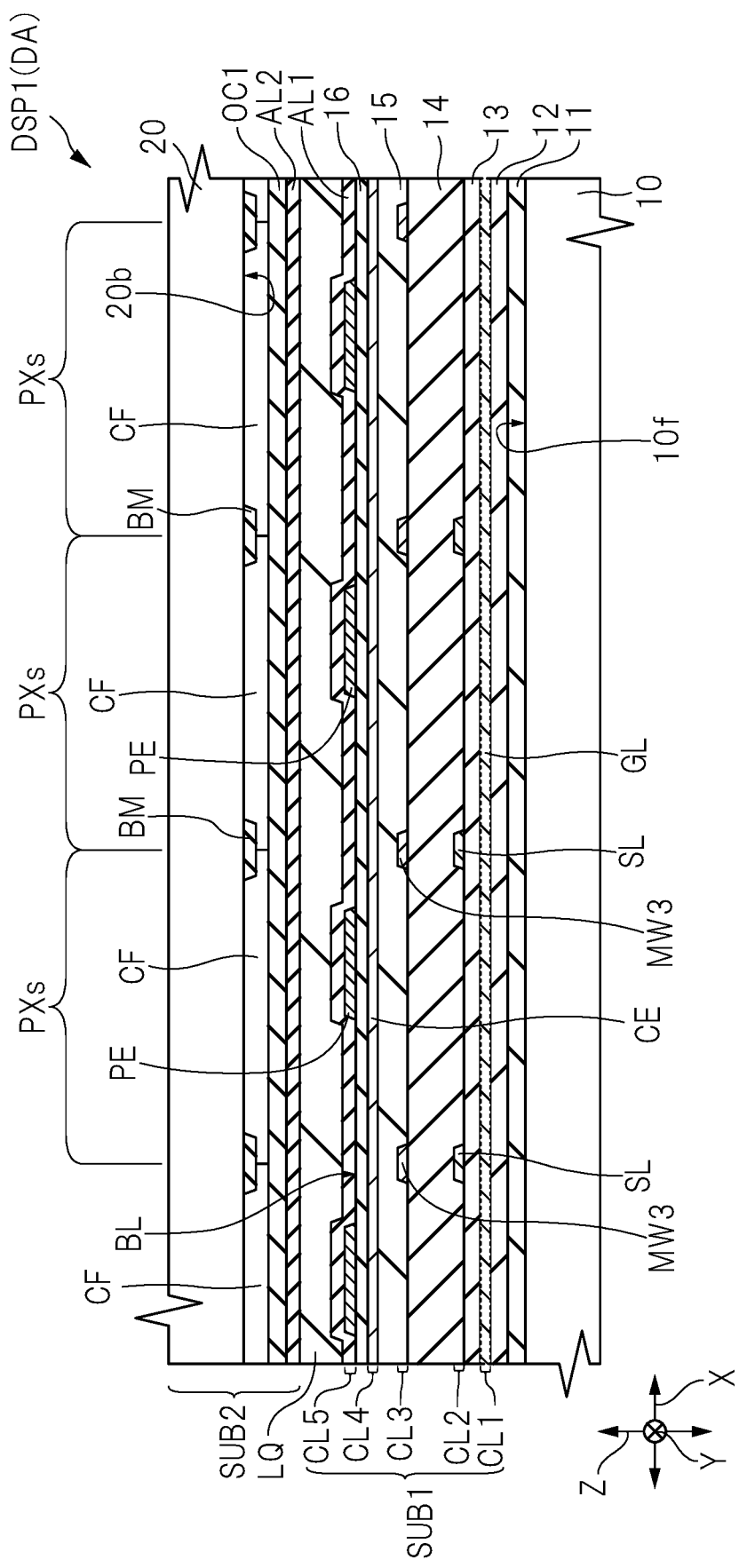
FIG. 4 is an enlarged sectional view illustrating one example of a detailed sectional structure in a display area illustrated in FIG. 2.

First, a configuration example of a display apparatus will be described. FIG. 1 is a plan view of a display surface side illustrating one example of a display apparatus according to the present embodiment. In FIG. 1, a boundary between a display area DA and a peripheral area PFA is indicated by a two-dot chain line. Further, in FIG. 1, an area where a seal material SLM is arranged is indicated by a dot pattern. FIG. 2 is a sectional view taken along an A-A line of FIG. 1. As illustrated in FIG. 4 (will be described later), a plurality of conductive layers and an insulator film exist between a substrate 10 and a substrate 20 in addition to a liquid crystal layer LQ. However, their illustration is omitted in FIG. 2. FIG. 3 is a circuit diagram illustrating a circuit configuration example around pixels included in the display apparatus illustrated in FIG. 1. FIG. 4 is an enlarged sectional view illustrating one example of a detailed sectional structure in the display area illustrated in FIG. 2.

As illustrated in FIG. 1, a display apparatus DSP1 according to the present embodiment has the display area DA. An image is formed in the display area DA in response to an input signal supplied from the outside thereof. The display area DA is an effective area in which the display apparatus DSP1 displays the image in a plan view of the display surface. Further, the display apparatus DSP1 has the peripheral area (non-display area) PFA around the display area DA in the plan view. Note that the display apparatus DSP1 includes the peripheral area PFA around the display area DA. However, as a modification example, there is also a display apparatus in which a display area DA extends to a peripheral portion. The technique described below can also be applied to a type of display apparatus in which the display area DA extends to the peripheral portion of the display apparatus. Further, the display area DA of the display apparatus DSP1 illustrated in FIG. 1 is a quadrangle, but the display area may have a shape other than the quadrangle such as a polygon or a circle.

As illustrated in FIG. 2, the display apparatus DSP1 includes a display panel DP1 and a backlight unit 40 as a light supplying unit facing the display panel DP1 and configured to emit visible light to the display panel DP1. The display panel DP1 includes a polarizing plate PL1, the substrate 10, the liquid crystal layer LQ, the substrate 20, and the polarizing plate PL2, which are laminated in this order on a front face 40f side that is a facing surface against the display panel DP1 of the backlight unit 40.

For details, the display panel DP1 of the display apparatus DSP1 includes the substrate 10 and the substrate 20 bonded to each other so as to face each other via the liquid crystal layer LQ. The substrates 10 and 20 face each other in a thickness direction of the display apparatus DSP1 (the Z direction). The substrate 10 has a front face (principal surface or surface) 10f facing the liquid crystal layer LQ (and the substrate 20) and a back face (principal surface or surface) 10b located on the opposite side of the front face 10f. Further, the substrate 20 has a back face (principal surface or surface) 20b facing the front face 10f (and the liquid crystal layer LQ) of the substrate 10. The substrate 10 is an array substrate in which a plurality of transistors (transistor elements) Tr1 (see FIG. 3) as switching elements (or active elements) is arranged in an array. Further, the substrate 20 is a substrate provided at the display surface side. The substrate 20 can be rephrased as a facing substrate in a sense that it is a substrate arranged so as to face the array substrate.

The liquid crystal layer LQ is located between the front face 10f of the substrate 10 and the back face 20b of the substrate 20. The liquid crystal layer LQ is an electrooptical layer configured to control a transmission state of the visible light. By controlling a state of the electric field formed around the liquid crystal layer LQ via the switching elements the transistors Tr1 illustrated in FIG. 3), it has a function of modulating the light passing therethrough. As illustrated in FIG. 2, the display area DA on the substrate 10 and the substrate 20 is superimposed on the liquid crystal layer LQ.

The substrate 10 and the substrate 20 are bonded to each other via the seal material (an adhesive material) SLM. As illustrated in FIG. 1, the seal material SLM is arranged under the peripheral area PFA so as to surround the periphery of the display area DA. As illustrated in FIG. 2, the liquid crystal layer LQ is arranged inside the seal material SLM. The seal material SLM serves as a seal for enclosing the liquid crystal between the substrate 10 and the substrate 20. Further, the seal material SLM serves as the adhesive material for adhering the substrate 10 and the substrate 20.

The display panel DP1 has the polarizing plate PL1 and the polarizing plate PL2. The polarizing plate PL1 is arranged between the substrate 10 and the backlight unit 40. The polarizing plate PL2 is arranged on the display surface side of the substrate 20, that is, on the opposite side of the substrate 10 with the substrate 20 interposed therebetween. A transmission axis of the polarizing plate PL1 and a transmission axis of the polarizing plate PL2 are orthogonal to each other. The backlight unit 40 includes the front face 40f facing the back face 10b of the substrate 10 and a back face 40b located on the opposite side of the front face 40f.

Further, the display apparatus DSP1 includes a cover member CVM (see FIG. 2) that covers the display surface side of the substrate 20. The cover member CVM faces the front face 10f on the opposite side of the back face 20b of the substrate 20. In other words, the cover member CVM faces a front face 20f on the opposite side of the back face 20b of the substrate 20. The substrate 20 is located between the cover member CVM and the substrate 10 in the Z direction. The cover member CVM is a protective member for protecting the substrates 10 and 20 and the polarizing plate PL2, and is arranged on the display surface side of the display apparatus DSP1. However, as a modification example with respect to the present embodiment, there may be no cover member CVM.

Each of the substrate 10 and the substrate 20 is a transparent plate material having visible light transparency (a characteristic that visible light transmits it). A glass substrate can be exemplified as a substrate that is the transparent plate material. Further, as a constituent material of the substrate 10 and the substrate 20, a resin material (a visible light transmissive resin material) containing a polymer such as polyimide, polyamide, polycarbonate, or polyester can also be used.

In case of the present embodiment, a flexible wiring board 50 is connected to the peripheral area PFA of the substrate 10. A terminal TM1 is formed on the front face 10f of the substrate 10. The terminal TM1 is formed in the peripheral area PFA. The flexible wiring board 50 includes a wiring 51 connected to the terminal TM1, and an insulator film 52 that covers the wiring 51 and is formed so as to be bendable and deformable.

One end of the flexible wiring board 50 is connected to the front face 10f of the substrate 10, and the other end thereof is arranged on the back face 40b side of the backlight unit 40. The flexible wiring board 50 is bent so as to cover a side surface of the substrate 10 and a side surface of the backlight unit 40.

Light supplied from the backlight unit 40 reaches the cover member CVM side via the polarizing plate PL1 including a polarizing plate, the substrate 10, the liquid crystal layer LQ, the substrate 20, and the polarizing plate PL2. An optical filter layer is arranged between the substrate 20 and the liquid crystal layer LQ. As illustrated in FIG. 4, the optical filter layer includes a light shielding film BM that blocks visible light, and plural types of color filter films CF.

As illustrated in FIG. 3, a plurality of pixels PX is arranged in the display area DA. In the example illustrated in FIG. 3, each of the plurality of pixels PX includes a plurality of subpixels PXs. For example, subpixels PXs for red, subpixels PXs for blue, and subpixels PXs for green are included in the plurality of subpixels PXs, and it is possible to display a color image by controlling a color tone of the plurality of subpixels PXs. As for the number of types of the subpixels PXs constituting one pixel PX, various modification examples can be applied in addition to the three types illustrated in FIG. 3.

Each of the plurality of subpixels PXs includes the transistor Tr1 that is a switching element configured to control ON/OFF of an electric field to be applied to the liquid crystal layer LQ. The transistor Tr1 controls an operation of the corresponding subpixel PXs. The transistor Tr1 is a thin film transistor (Thin Film Transistor: TFT) formed on the substrate 10.

As illustrated in FIG. 3, the display apparatus DSP1 includes a plurality of scanning signal lines GL extending in the X direction in the display area DA, and a plurality of video signal lines SL extending in the Y direction intersecting the X direction (orthogonally in FIG. 3) in the display area DA. The scanning signal line GL is a gate line connected to gates of the transistors Tr1. Further, the video signal line SL is a source line connected to sources of the transistors Tr1. Each of the plurality of scanning signal lines GL extends in the X direction, and is arranged in the Y direction at equal intervals, for example. Each of the plurality of video signal lines SL extends in the Y direction, and is arranged in the X direction at equal intervals, for example.

Each of the plurality of scanning signal lines GL is connected to a scanning drive circuit (gate drive circuit) GD. A scanning signal Gsi outputted from the scanning drive circuit GD is inputted into the gates of the transistors Tr1 via the scanning signal lines GL. Further, each of the plurality of video signal lines SL is connected to a video signal drive circuit SD. A video signal Spic outputted from the video signal drive circuit SD is inputted into the sources of the transistors Tr1 via the video signal lines SL.

Each of the plurality of video signal lines SL is connected to a pixel electrode PE via the corresponding transistor Tr1. For details, the video signal lines SL are connected to the sources of the transistors Tr1, and the pixel electrode PE is connected to a drain of the corresponding transistor Tr1. When the transistor Tr1 is turned ON, the video signal Spic is supplied to the corresponding pixel electrode PE from the video signal line SL. Further, the pixel electrodes PE are connected to a corresponding common electrode CE via a dielectric layer (a capacitative element CS illustrated in FIG. 3). A fixed potential is applied to the common electrodes CE from a common potential applying circuit CD. The fixed potential applied to the common electrodes CE is a potential common to the plurality of subpixels PXs. During a display period, an electric field is formed in each subpixel PXs in accordance with a potential difference between the potential applied to the common electrodes CE and a potential applied to the pixel electrode PE, and liquid crystal molecules included in the liquid crystal layer LQ are driven by this electric field.

Each of the scanning drive circuit GD, the video signal drive circuit SD, and the common potential applying circuit CD, which are illustrated in FIG. 3, are formed in the flexible wiring board 50 connected to the peripheral area PFA of the substrate 10 illustrated in FIG. 2, for example. Further, as a modification example, a semiconductor chip in which a part or all of the scanning drive circuit GD, the video signal drive circuit SD, and the common potential applying circuit CD, which are illustrated in FIG. 3, is formed may be mounted on the flexible wiring board 50. Further, as another modification example, a semiconductor chip in which a part or all of the scanning drive circuit GD, the video signal drive circuit SD, and the common potential applying circuit CD, which are illustrated in FIG. 3, is formed may directly be mounted on the peripheral area PFA of the substrate 10 illustrated in FIG. 2.

Further, as illustrated in FIG. 4, a plurality of conductive layers CL1 to CL5, a plurality of insulator films 11 to 16, and an oriented film AL1 are provided between the substrate 10 and the liquid crystal layer LQ. The plurality of conductive layers CL1 to CL5, the plurality of insulator films 11 to 16, and the oriented film AL1 are formed on the front face 10f of the substrate 10. Further, the light shielding film BM, a color filter film CF, an insulator film OC1, and an oriented film AL2 are provided between the substrate 20 and the liquid crystal layer LQ. The light shielding film BM, the color filter film CF, the insulator film OC1, and the oriented film AL2 are formed on the back face 20b of the substrate 20. As illustrated in FIG. 4, a structure including the substrate 10 and each of the structures (from the insulator film 11 to the oriented film AL1) laminated between the front face 10f of the substrate 10 and the liquid crystal layer LQ can be defined as a substrate SUB1. Further, a structure including the substrate 20 and each of the structures (from the color filter film CF to the oriented film AL2) laminated between the back face 20b of the substrate 20 and the liquid crystal layer LQ can be defined as a substrate SUB2.

A light-shielding metal conductor pattern (metal wiring) is formed in each of the conductive layers CL1, CL2, and CL3 illustrated in FIG. 4. The conductive layer CL1 and the conductive layer CL3 include a metal film made of a metal such as molybdenum (Mo) or tungsten (W) or an alloy thereof, for example. The conductor pattern of the conductive layer CL2 includes a metal film having a multilayer structure such as a laminated film in which an aluminum (Al) film is sandwiched by a titanium (Ti) film or a titanium nitride (TiN) film, for example. Further, the conductive layer CL4 and the conductive layer CL5 mainly contain a conductive oxide material (transparent conductive material) such as ITO (Indium tin oxide) or IZO (Indium Zinc Oxide).

The insulator film is interposed among the conductive layers CL1 to CL5. The insulator film 11 and the insulator film 12 are interposed between the conductive layer CL1 and the substrate 10. The insulator film 13 is interposed between the conductive layer CL1 and the conductive layer CL2. The insulator film 14 is interposed between the conductive layer CL3 and the conductive layer CL4. The insulator film 15 is interposed between the conductive layer CL4 and the conductive layer CL5. The oriented film AL1 is interposed between the conductive layer CL5 and the liquid crystal layer LQ. Each of the insulator films 11, 12, 13, and 16 is an inorganic insulator film. As the inorganic insulator films, a silicon nitride (SiN) film, a silicon oxide (SiO) film, an aluminum oxide (AlOx) film or a laminated film thereof can be exemplified, for example. Further, the insulator film 14 and the insulator film 15 are organic insulator films such as an acrylic photosensitive resin, for example.

Each of the plurality of scanning signal lines GL is formed in the conductive layer CL1 on the substrate 10. The insulator film 11 and the insulator film 12 are laminated on the substrate 10, and the scanning signal lines GL are formed on the insulator film 12. Each of the plurality of video signal lines SL is formed in the conductive layer CL2 on the substrate 10. The insulator films 11, 12, and 13 are laminated on the substrate 10, and the video signal lines SL are formed on the insulator film 13.

A semiconductor layer of the transistor (transistor element) Tr1 illustrated in FIG. 3 is formed between the insulator film 11 and the insulator film 12. Since the semiconductor layer is located in a cross section different from that illustrated in FIG. 4, the semiconductor layer is not illustrated in FIG. 4. A source region of the semiconductor layer is electrically connected to the video signal lines SL formed in the conductive layer CL2. A drain region of the semiconductor layer is electrically connected to the pixel electrodes PE in the conductive layer CL5. In a plan view, each of the scanning signal lines GL extends between the source region and the drain region of the semiconductor layer. Further, the scanning signal lines GL overlaps with a channel region of the semiconductor layer, and serve as gate electrodes of the transistors Tr1. The insulator film 12 interposed between the channel region and the scanning signal lines GL serves as a gate insulator film. As in the example described above, a TFT having a structure in which a gate electrode is arranged above the channel region of the transistors Tr1 is called a top gate system. However, there are various modification examples of the TFT system, and for example, a bottom gate system in which a gate electrode is arranged below a channel region may be used. alternatively, there is also a system in which gate electrodes are arranged both above and below a channel region.

Wirings MW3 are arranged in the conductive layer CL3. The wiring MW3 is a metal wiring made of metal in the similar manner to the scanning signal lines GL and the video signal lines SL. The wirings MW3 are arranged at positions overlapping with the video signal lines SL in the thickness direction (the Z direction). The wirings MW3 are electrically connected to the common electrodes CE formed in the conductive layer CL4. In this case, the wiring MW3 can be used as a wiring for applying a potential to the common electrode CE. Alternatively, in a case where the display apparatus DSP1 has a touch panel function, the wiring MW3 is used as a signal transmission path for transmitting a drive signal or a detection signal that are used for detecting a touch position.

Further, as will be described later, in case of the present embodiment, a part of the plurality of video signal lines SL intersects with each other in a frame area FRA. The conductive layer CL3 is used as a wiring layer for causing the video signal lines SL to intersect with each other. In other words, of the video signal lines SL caused to intersect with each other, a detour wiring portion of one video signal line SL is formed in the conductive layer CL3.

The common electrodes CE are formed in the conductive layer CL4. The common electrodes CE are formed on the insulator film 15 that is a flattening film. FIG. 4 illustrates one common electrode CE, but a plurality of common electrodes CE may be arranged apart from each other in the display area DA illustrated in FIG. 1. Further, as described above, a potential common to the plurality of subpixels PXs is applied to the common electrode CE. For this reason, as illustrated in FIG. 4, the common electrode CE may be arranged over the plurality of subpixels PXs. The pixel electrode PE formed in each of the plurality of subpixels PXs faces the common electrode CE, and overlaps with the common electrode CE in a plan view.

The plurality of pixel electrodes PE is formed in the conductive layer CL5. The insulator film 16, which is an inorganic insulator film, is interposed between the conductive layer CL5 in which the pixel electrode PE is formed and the conductive layer CL4 in which the common electrode CE is formed. This insulator film 16 serves as a dielectric layer, whereby the capacitative element CS illustrated in FIG. 3 is formed.

The plurality of pixel electrodes PE is covered with the oriented film AL1. The oriented film AL1 is an organic insulator film that has a function of aligning initial orientation of the liquid crystal molecules included in the liquid crystal layer LQ, and is made of a polyimide resin, for example. Further, the oriented film AL1 is in contact with the liquid crystal layer LQ.

The color filter film CF is formed on the back face 20b side facing the substrate 10. In the example illustrated in FIG. 3, the color filter films CF with three colors of red (R) , green (G) , and blue (B) are arranged periodically. In a color display apparatus, for example, a color image is displayed using these pixels with the three colors of red (R), green (G), and blue (B) as one set. The plurality of color filter films CF of the substrate 20 is arranged at positions respectively facing each other with the pixels PX (see FIG. 1) each having the pixel electrode PE formed in the substrate 10. Note that the types of color filters are not limited to the three colors of red (R), green (G), and blue (B).

Further, the light shielding film BM is arranged at each boundary of the color filter films CF of each color. The light shielding film BM is called a black matrix, and is made of a black resin or a low reflection metal, for example. The light shielding film BM is formed in a grid pattern in a plan view, for example. In other words, the light shielding film BM extends in the X direction and the Y direction. For details, the light shielding film BM includes a plurality of portions extending in the Y direction and a plurality of portions extending in the X direction that intersects the Y direction. By partitioning each of the pixels PX with the black matrix, it is possible to suppress light leakage and color mixing.

The light shielding film BM overlaps with the scanning signal lines GL, the video signal lines SL, and the wirings MW3, which are metal wirings, in the display area DA. The metal wiring having a light-shielding property is arranged at a position where the metal wiring overlaps with the light shielding film BM, whereby it becomes difficult to visually recognize the metal wiring on a display screen. On the other hand, at least a part of the common electrode CE and the pixel electrode PE is arranged at a position where they do not overlap with the light shielding film BM. The common electrode CE and the pixel electrode PE are made of a conductive material that transmits visible light. For this reason, although the common electrode CE and the pixel electrode PE are arranged at the positions where they do not overlap with the light shielding film BM, visible light is not shielded by the common electrode CE or the pixel electrode PE in each subpixel PXs.

Further, the light shielding film BM is also formed in the peripheral area PFA (see FIG. 1) of the substrate 20. The peripheral area PFA overlaps with the light shielding film BM. The display area DA is defined as an area inside the peripheral area PFA. Further, the peripheral area PFA is an area where the peripheral area PFA overlaps with the light shielding film BM that blocks light emitted from the backlight unit (light source) 40 illustrated in FIG. 2. Although the light shielding film BM is also formed in the display area DA, a plurality of openings is formed in the light shielding film BM within the display area DA. Among the openings that are generally formed in the light shielding film BM and from with the color filter is exposed, the end of the opening formed on the most peripheral side is defined as a boundary between the display area DA and the peripheral area PFA.

The insulator film OC1 covers the color filter film CF and the light shielding film BM. The insulator film OC1 serves as a protective film that prevents impurities from diffusing from the color filter to the liquid crystal layer. The insulator film OC1 is an organic insulator film made of an acrylic photosensitive resin, for example.

The insulator film OC1 is covered with the oriented film AL2. The oriented film AL2 is an organic insulator film that has a function of aligning initial orientation of the liquid crystal molecules included in the liquid crystal layer LQ, and is made of a polyimide resin, for example. Further, the oriented film AL2 is in contact with the liquid crystal layer LQ.

<Details of Rotational Motion of Liquid Crystal Molecules>

Figure 5:
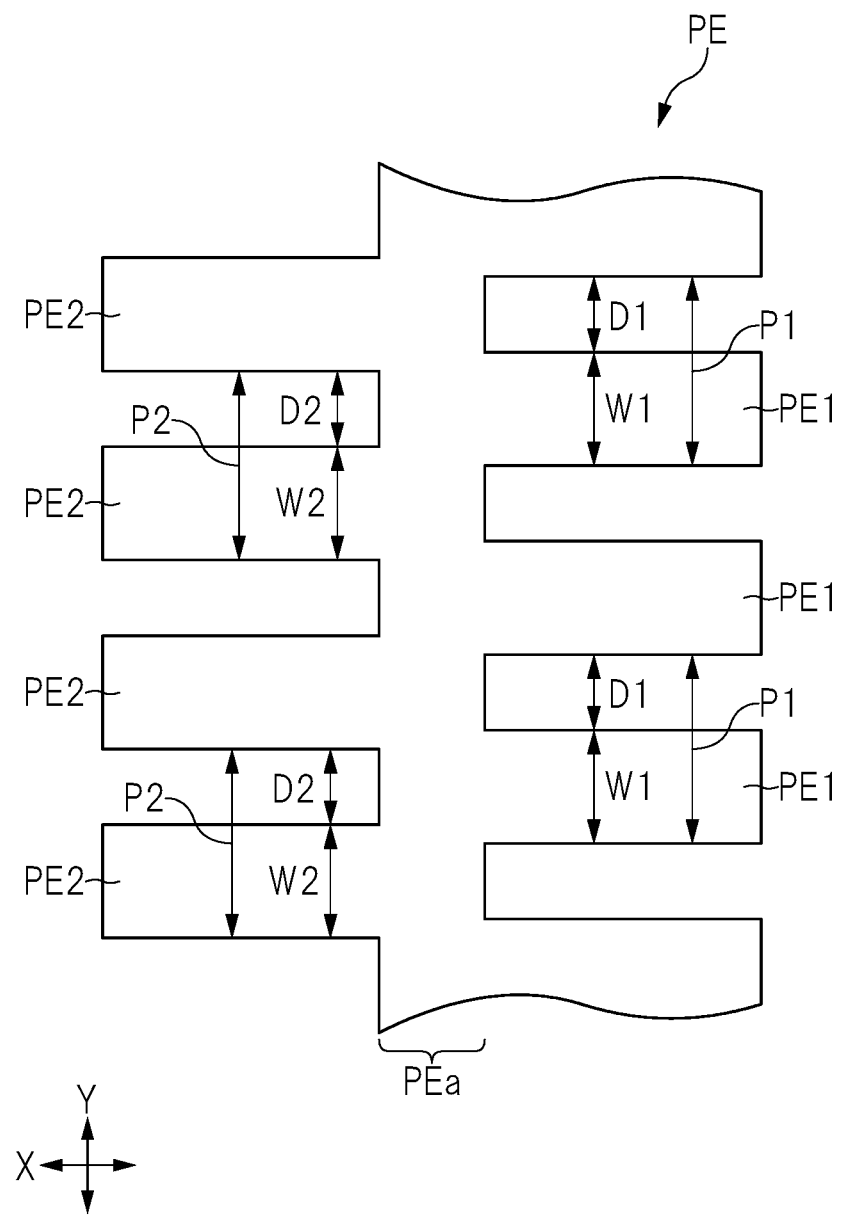
FIG. 5 is a plan view illustrating a structure example of pixel electrode illustrated in FIG. 4 in a plan view.

Next, a structure example of the pixel electrodes illustrated in FIG. 4 and an example of rotational motion of the liquid crystal molecules will be described. FIG. 5 is a plan view illustrating a structure example of the pixel electrodes illustrated in FIG. 4 in a plan view. In the conductive layer CL5 illustrated in FIG. 4, the pixel electrode PE having a shape illustrated in FIG. 5 is provided in each of the subpixels PXs.

As illustrated in FIG. 5, a plurality of branch electrodes PE1 and PE2 is included in the pixel electrode PE, and in a plan view, each of a plurality of branch electrodes PE1 and PE2 extends in the X direction and are adjacent to each other in the Y direction. The plurality of branch electrodes PE1 is connected to each other by a connecting portion Pea extending in the Y direction, and the plurality of branch electrodes PE2 is also connected to each other by the connecting portion PEa. The plurality of branch electrodes PE1 and the plurality of branch electrodes PE2 are arranged on opposite sides to each other in the X direction via the connecting portion PEa. Further, a branch electrode group composed of the plurality of branch electrodes PE1 and a branch electrode group composed of the plurality of branch electrodes PE2 are arranged so as to be offset by a half pitch in the Y direction. Such an arrangement is called a staggered arrangement.

Note that the plurality of branch electrodes PE1, the plurality of branch electrodes PE2, and the connecting portion PEa are conductive films formed in the same layer, but the following description will mainly be made using the plurality of branch electrodes PE1. Further, although it is not illustrated in the drawings, the common electrode CE is formed in a planar shape over the entire upper surface of the substrate SUB1, and the plurality of branch electrodes PE1, the plurality of branch electrodes PE2, and the connecting portion PEa face the common electrode CE. However, they overlap with the common electrode CE in a plan view.

In the example illustrated in FIG. 5, pitches P1 and P2 of the plurality of branch electrodes PE1 and the plurality of branch electrodes PE2 in the Y direction are equal to each other. The pitch P1 referred to here is defined by the sum of a width W1 of one branch electrode PE1 in the Y direction and a distance D1 between two branch electrodes PE1 adjacent to each other in the Y direction. Similarly, the pitch P2 is defined by the sum of a width W2 of one branch electrode PE2 in the Y direction and a distance D2 between two branch electrodes PE2 adjacent to each other in the Y direction. Each of the width W1 of one branch electrode PE1 and the width W2 of one branch electrode PE2 is 3 pm, for example. Further, each of the distance (or a clearance) D1 between the two adjacent branch electrodes PE1 in the Y direction and the distance (or a clearance) D2 between the two adjacent branch electrodes PE2 in the Y direction is 2 μm, for example.

The plurality of branch electrodes PE1, the plurality of branch electrodes PE2, and the connecting portion PEa are conductive films formed in the same layer (the conductive layer CL5 illustrated in FIG. 4). In the following description, behavior of the liquid crystal molecules around the plurality of branch electrodes PE1 will be covered and described. The liquid crystal molecules arranged in the liquid crystal layer LQ illustrated in FIG. 4 operate under an influence of an electric field formed by applying a voltage between the pixel electrode PE and the common electrode CE. In the following description regarding the operation of the liquid crystal molecules, expressions such as "apply a voltage" or "turn on a voltage" means that "a voltage is applied between the pixel electrode PE and the common electrode CE".

As illustrated in FIG. 4, in the display apparatus DSP1 according to the embodiment (see FIG. 2), the pixel electrode PE and the common electrode CE are respectively formed in the different layers. Further, of the common electrode CE and the pixel electrode PE, the pixel electrode PE formed in the conductive layer CL5 relatively close to the liquid crystal layer LQ has the plurality of branch electrodes PE1 formed in a comb tooth as illustrated in FIG. 5. When the voltage is applied between the common electrode CE and the pixel electrode PE, the liquid crystal molecules in the liquid crystal layer LQ rotate in a direction parallel to the upper surface of the substrate SUB1 or the substrate SUB2, that is, in a direction parallel to the horizontal plane composed of the X direction and the Y direction illustrated in FIG. 5.

Figure 6:
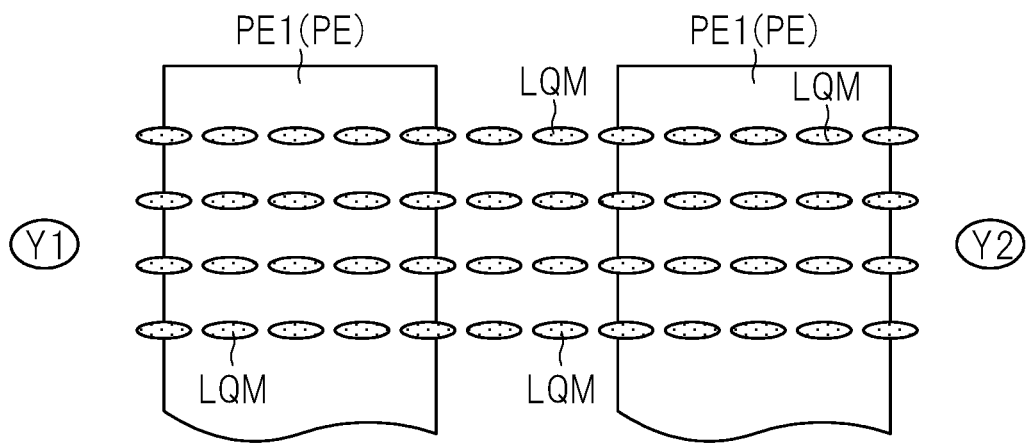
FIG. 6 is a plan view schematically illustrating operating directions of liquid crystal molecules before and after applying a voltage.
Figure 6:
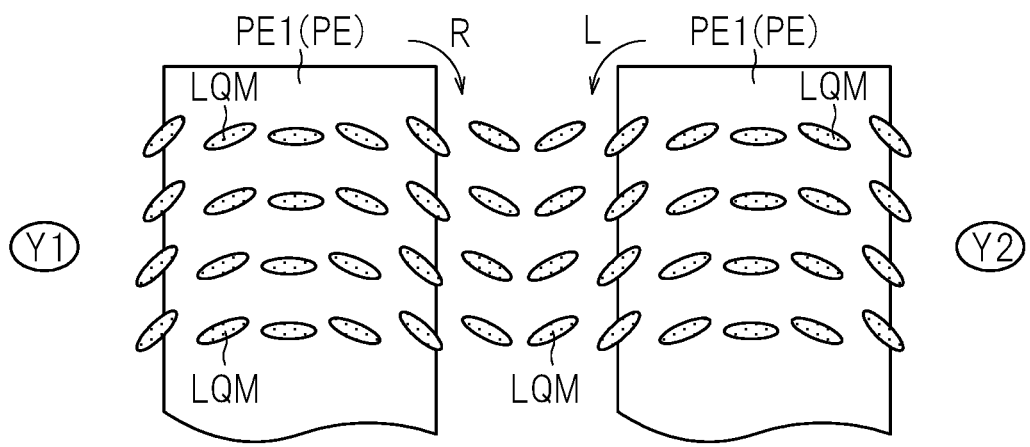

FIG. 6 is a plan view schematically illustrating operating directions of the liquid crystal molecules before and after applying a voltage. In FIG. 6, an upper stage illustrates an initial orientation state of the liquid crystal molecules before applying the voltage, and a lower stage illustrates a state of the liquid crystal molecules after applying the voltage. Note that negative liquid crystals or positive liquid crystals can be used for the liquid crystal layer LQ illustrated in FIG. 4, but in the embodiment, a case where the liquid crystal layer LQ is negative liquid crystals is illustrated. In this case, as schematically illustrated in FIG. 6, a direction of initial orientation of the liquid crystal molecules LQM is a direction (the Y direction) orthogonal to a direction (the X direction) in which the branch electrodes PE1 extend.

As illustrated in FIG. 6, an orientation direction (or an orientation angle) of the liquid crystal molecules LQM changes continuously from the center of one branch electrode PE1 (on a Y1 side) to the center of the other branch electrode PE1 (on a Y2 side) in the Y direction. Namely, after the voltage is applied, the orientation direction of the liquid crystal molecules LQM changes continuously in the Y direction.

The liquid crystal molecules LQM rotate in a clockwise (right-hand) direction R in the vicinity of the end of the one branch electrode PE1 (on the Y1 side), while the liquid crystal molecules LQM rotate in a counterclockwise (left-hand) direction L in the vicinity of the end of the other branch electrode PE1 (on the Y2 side). The orientation direction of the liquid crystal molecules LQM changes most in the vicinity of the end of the branch electrode PE1, but a rotational direction of the liquid crystal molecules LQM in the one branch electrode PE1 (on the Y1 side) is opposite to a rotational direction of the liquid crystal molecules LQM in the other branch electrode PE1 (on the Y2 side).

As described above, in a case where the liquid crystal molecules LQM are driven (that is, caused to rotate) by using the pixel electrode PE (see FIG. 5) provided with the plurality of branch electrodes PE1, the rotational direction and the degree of rotation of the liquid crystal molecules LQM change in accordance with a planar positional relationship between the branch electrode PE1 and the liquid crystal molecules LQM. In case of such a drive method, it is possible to increase a response speed of the liquid crystal molecules LQM as compared with a method of driving liquid crystal molecules (whose illustration is omitted) by using a simple rod-shaped or island-shaped patterned pixel electrode (whose illustration is omitted).

Further, in a case where the liquid crystal molecules LQM are driven (that is, caused to rotate) by using the pixel electrode PE (see FIG. 5) provided with the branch electrodes PE1, light (visible light) emitted from the backlight unit 40 illustrated in FIG. 2 is diffracted as the light is transmitted in the liquid crystal layer LQ. By referring a formation surface of the pixel electrode PE illustrated in FIG. 4 (in the example illustrated in FIG. 4, a front face of the insulator film 15) as abase level BL, a normal direction of the base level BL (to be exact, a normal direction from the base level BL toward the backlight unit 40 illustrated in FIG. 2) is set to 0 degrees. In this case, it can be considered that of the light emitted from the backlight unit 40 (see FIG. 2) , light emitted from a direction of 0 degrees when viewed from the base level BL is not diffracted substantially at the time of the initial orientation state where no voltage is applied thereto (the state illustrated in the upper state of FIG. 6). Therefore, most of the light emitted from the direction of 0 degrees is not diffracted and is transmitted in the liquid crystal layer LQ, and is emitted in a direction of 180 degrees when viewed from the base level BL. On the other hand, at the time of the state where the voltage is applied thereto (the state illustrated in the lower stage of FIG. 6), part of the light emitted from the direction of 0 degrees when viewed from the base level BL is diffracted in the liquid crystal layer LQ, and is emitted in any direction other than 180 degrees when viewed from the base level BL. The intensity of light emitted in the direction of 180 degrees when viewed from the base level BL becomes smaller than the intensity of light at the time of the state where the orientation of the liquid crystal molecules LQM (see FIG. 6) is the initial orientation.

In the display apparatus DSP1 illustrated in FIG. 2, the transmission axis of the polarizing plate PL1 and the transmission axis of the polarizing plate PL2 are orthogonal to each other. Further, any one of the transmission axis of the polarizing plate PL1 and the transmission axis of the polarizing plate PL2 is parallel to the direction of the orientation of the liquid crystal molecules LQM when no voltage is applied to the pixel electrode PE illustrated in FIG. 6. In other words, the display panel DP1 of the display apparatus DSP1 is configured in a normally black state where it becomes a black display in a state where the voltage is applied between the pixel electrode PE and the common electrode CE illustrated in FIG. 4. For this reason, in case of the display apparatus DSP1, white luminance (luminance of white light emitted from the back face side to the color filter film CF) is determined by the intensity of light (the amount of light) emitted from directions other than 0 degrees. In other words, the white luminance is determined by the intensity of light emitted from the directions inclined with respect to the normal direction from the base level BL toward the backlight unit 40 (see FIG. 2). On the other hand, black luminance is determined by the intensity of light (the amount of light) emitted from the direction of 0 degrees. In other words, the black luminance is determined by the intensity of light emitted from the normal direction from the base level BL toward the backlight unit 40 (see FIG. 2). Note that in the present application, the expression "other than 0 degrees" is used as the meaning "different from 0 degrees", and 0 degrees is not included in "other than 0 degrees".

Figure 7:
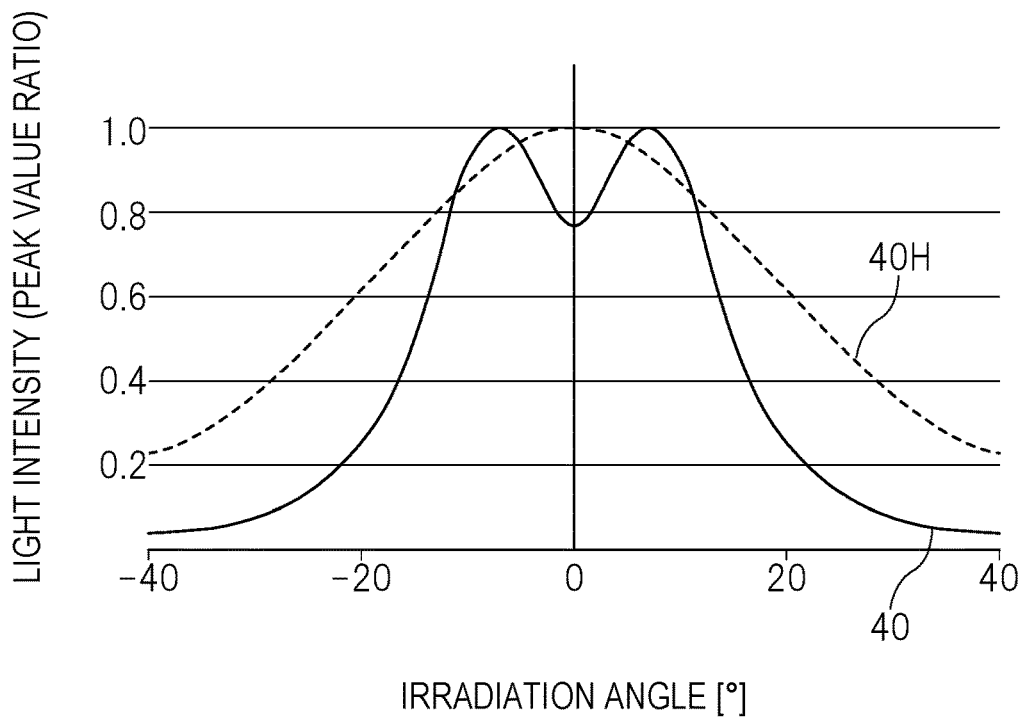
FIG. 7 is an explanatory drawing illustrating optical characteristics of a backlight unit of the display apparatus illustrated in FIG. 2.
Figure 8:
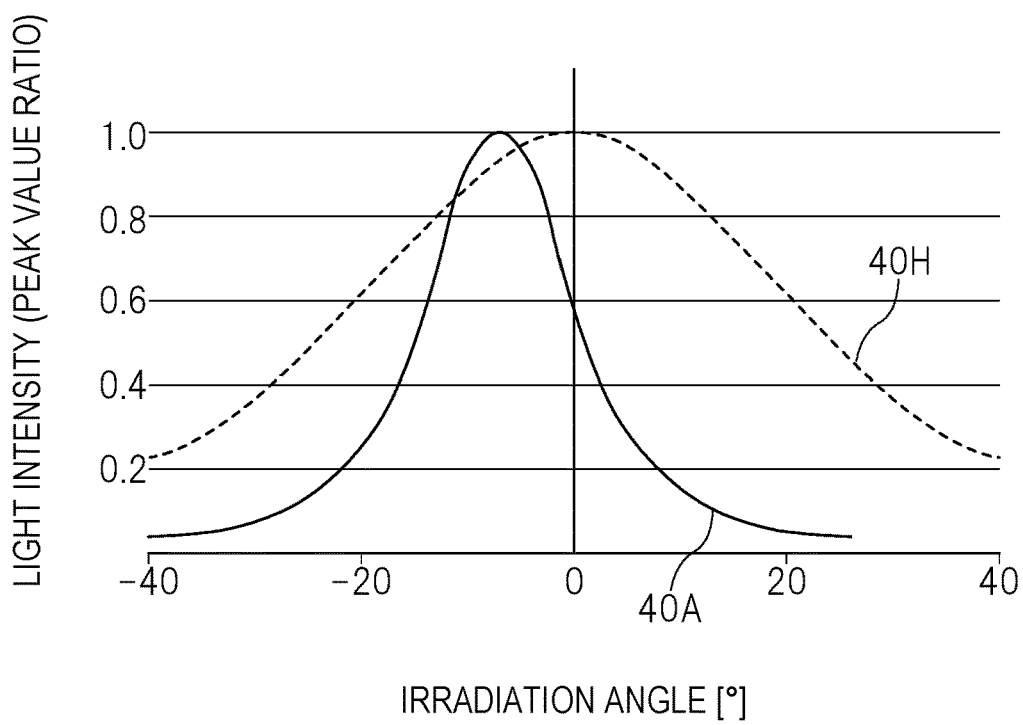
FIG. 8 is an explanatory drawing illustrating optical characteristics of a backlight according to a modification example with respect to FIG. 7.

The display apparatus DSP1 according to the embodiment (see FIG. 2) uses a diffraction characteristic of visible light generated due to the structure of the pixel electrode PE to improve brightness of the screen or contrast of the displayed image. FIG. 7 is an explanatory drawing illustrating optical characteristics of the backlight unit in the display apparatus illustrated in FIG. 2. FIG. 8 is an explanatory drawing illustrating optical characteristics of a backlight according to a modification example with respect to FIG. 7. In FIG. 7, a horizontal axis indicates an irradiation angle of visible light when the normal direction with respect to the base level described above is set to 0 degrees, and a vertical axis indicates a ratio of the intensity of light with respect to a peak value. Further, in FIG. 7, the characteristic of light emitted from the backlight unit illustrated in FIG. 2 is indicated by a solid line, and the characteristic of light emitted from a backlight unit according to a study example is indicated by a dot line.

In case of a general backlight unit, like a characteristic curve of a backlight unit 40H illustrated in FIG. 7, it becomes a peak when an emission angle is 0 degrees. On the other hand, in case of the backlight unit 40, light supplied from the backlight unit 40, which is the light supplying unit, has peaks of the intensity of light at angles other than 0 degrees in a visible light region. In the example illustrated in FIG. 7, the backlight unit 40 has peaks at 8 degrees and −8 degrees.

In a case where the backlight unit 40 having the characteristic illustrated in FIG. 7 is used in combination with the pixel electrode PE provided with the plurality of branch electrodes PE1 as illustrated in FIG. 5, contrast is improved due to the following reasons. Namely, in case of the display apparatus DSP1, the white luminance is determined by the intensity of light emitted from the directions other than 0 degrees. The backlight unit 40 has the peaks at irradiation angles other than 0 degrees. Therefore, it is possible to increase the white luminance as compared with the case where the backlight unit 40H illustrated in FIG. 7 is used. On the other hand, the black luminance is determined by the intensity of light emitted from the direction of 0 degrees. In case of the backlight unit 40, the intensity of light when the irradiation angle is 0 degrees is lower than the intensity of light when the irradiation angle is 8 degrees or −8 degrees. Therefore, it is possible to reduce the black luminance as compared with the case where the backlight unit 40H illustrated in FIG. 7 is used. In other words, it is possible to reduce light leakage when a black color is displayed. Thus, in case of the display apparatus DSP1 provided with the backlight unit 40, the white luminance becomes relatively large and the black luminance becomes relatively small as compared with a display apparatus (whose illustration is omitted) using the backlight unit 40H illustrated in FIG. 7. As a result, it is possible to increase the contrast of the displayed image.

As described above, in the example illustrated in FIG. 7, the backlight unit 40 has the peaks at 8 degrees and −8 degrees. If the intensity of light at the time of 0 degrees becomes lower than the intensity of light at the irradiation angle other than 0 degrees, it is possible to reduce the black luminance. For example, in case of a backlight unit 40A according to a modification example illustrated in FIG. 8, it has a peak at −8 degrees. The intensity of light at the time of 8 degrees is lower than the intensity of light at the time of 0 degrees. Therefore, if there is at least one irradiation angle at which the intensity of light becomes the maximum in the irradiation angles other than 0 degrees like a characteristic curve of the backlight unit 40A, it is possible to improve contrast. However, it is preferable that it has peaks at a plurality of angles in the irradiation angles other than 0 degrees from the viewpoint of improving the white luminance.

Further, it is preferable that it has peaks at a plurality of angles crossing over 0 degrees in the characteristic curve of the intensity of light. Further, it is particularly preferable that the plurality of angles crossing over 0 degrees have the same absolute value. In this case, since it is possible to improve the white luminance, it is further possible to improve the contrast as compared with a case where there is one peak.

There are various modification examples in the width W1 and W2, the distance D1 and D2, and the pitch P1 and P2 illustrated in FIG. 5. However, there is a preferred range. For example, in case of a driving method using a comb-tooth pixel electrode like the pixel electrode PE illustrated in FIG. 5, it is possible to increase the response speed of the liquid crystal molecules LQM (see FIG. 6). In order to obtain this effect of increasing the response speed, it is particularly preferable that the values of the pitches P1 and P2 illustrated in FIG. 5 are 9 μm or shorter.

Further, in the example illustrated in FIG. 7, the example in which the absolute value of the irradiation angle having the peak of the intensity of light (hereinafter, referred to as a "peak angle") becomes 8 degrees is illustrated. However, according to the study of the inventor of the present application, it has been found that it is particularly preferable that the peak angle is within a certain range in relation to the pitch P1 illustrated in FIG. 5. Namely, the pitch P1 defined by the sum of the width W1 of each of the plurality of branch electrodes PE1 and the clearance (the distance D1) of the branch electrodes PE1 adjacent to each other of the plurality of branch electrodes PE1 is set to p. The irradiation angle (the peak angle) when the intensity of light supplied from the backlight unit 40 (see FIG. 2) becomes a peak is set to θ. Further, a wavelength of the visible light region is set to λ. In this case, it is preferable that the peak angle is within a range where a formula "$p \times \sin\theta = \theta$" is satisfied.

For example, it is preferable that the peak angle θ is within a range of $5.164 < |\theta| < 7.470$ when the pitch P1 illustrated in FIG. 5 is 5 μm. Further, it is preferable that the peak angle e is within a range of $2.866 < |\theta| < 4.142$ when the pitch P1 is 9 μm. Further, it is preferable that the peak angle θ is within a range of $13.00 < |\theta| < 18.97$ when the pitch P1 is 2 μm. Note that in the examples described above, they are calculated under a condition that the visible light region is 450 nm or more and 650 nm or less. in a case where the peak angle θ is a value within each of the ranges as described above, it is possible to increase the white luminance in the normal direction of the base level BL illustrated in FIG. 4 and toward the substrate 20 due to a relationship between the diffraction phenomenon of light and the peak angle θ. However, even in a case where the peak angle θ is not within the above range, it is possible to increase the contrast so long as it has a characteristic of having a peak at an angle other than 0 degrees. <Configuration Example of Backlight Unit>

Figure 9:
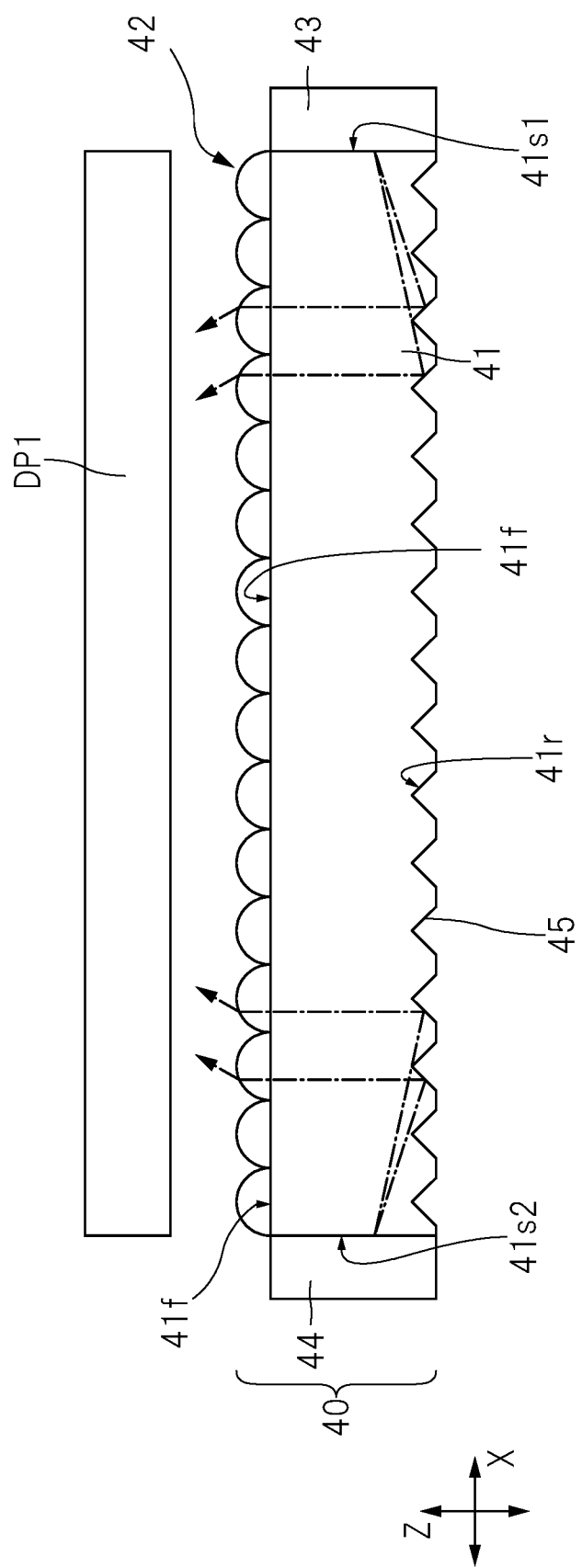
FIG. 9 is a sectional view illustrating a configuration example of the backlight unit illustrated in FIG. 2.

Next, a configuration example of the backlight unit 40 that can set the peak angle to an angle other than 0 degrees will be described. Note that there are various configurations of the backlight unit 40, which realizes that the peak angle is set to any angle other than 0 degrees. Hereinafter, one configuration example of the backlight unit 40 will be described. FIG. 9 is a sectional view illustrating a configuration example of the backlight unit illustrated in FIG. 2. FIG. 9 is the sectional view, but hatching is omitted in order to schematically illustrate a path of light emitted from light sources 43 and 44.

The backlight unit 40 illustrated in FIG. 9 includes a light guide plate 41 and a lens sheet 42. The light guide plate 41 includes an emission surface 41f and a reflecting surface 41r located inside an opposite surface of the emission surface 41f. The lens sheet 42 is arranged on the emission surface 41f side of the light guide plate 41. Further, the backlight unit 40 includes the light source 43 and the light source 44. The light source 43 is arranged at a position facing a side surface 41s1 of the light guide plate 41. The light source 44 is arranged at a position facing a side surface 41s2 located on the opposite side of the side surface 41s1. Each of the light sources 43 and 44 includes a light emitting element such as an LED (Light Emitting Diode), for example. Note that in the example illustrated in FIG. 9, a structure example of the backlight unit 40 is simplified and described. In addition to the configuration illustrated in FIG. 9, for example, an optical element such as a polarizing element or a diffuser plate phase difference element may be included.

The backlight unit 40 is arranged so that a normal direction of the emission surface 41f of the light guide plate 41 coincides with a normal direction of the base level BL illustrated in FIG. 4 and the lens sheet 42 faces the display panel DP1. A plurality of grooves 45 is formed on the outside of the reflecting surface 41r in the light guide plate 41, for example. The plurality of grooves 45 is formed so that light emitted from the light sources 43 and 44 is reflected by the reflecting surface 41r of the light guide plate 41 and is emitted in the normal direction of the emission surface 41f. The lens sheet 42 formed on the light guide plate 41 includes a plurality of lenses. The light is refracted when it is emitted from the lens sheet 42, and is emitted to the display panel DP1 at an angle inclined with respect to the normal direction of the emission surface 41f in the light guide plate 41.

The backlight unit 40 can control the peak angle described above by adjusting a refraction angle of the light emitted to the lens sheet 42. As a method of controlling the peak angle of the emitted light as in the backlight unit 40, a backlight unit used in a display apparatus configured to display a stereoscopic image with the naked eye as in Patent Document 3 (Japanese Patent Application Publication No. 2013-515277) or Patent Document 4 (Japanese Patent Application Publication No. 2007-94035) described above can be applied, for example. In case of the display apparatus configured to display a stereoscopic image with the naked eye, for example, by alternately repeating an ON/OFF operation of the light sources 43 and 44 illustrated in FIG. 9, an image for the left eye and an image for the right eye are displayed. In case of the backlight unit 40, by turning ON the light sources 43 and 44 at the same time, for example, a peak characteristic of the intensity of light as illustrated in FIG. 7 can be obtained. Further, in a case where any one of the light sources 43 and 44 is turned ON and the other is turned OFF, as illustrated in FIG. 8, a characteristic curve having one peak at an angle different from 0 degrees can be obtained.

The one example of the backlight unit 40 as the light supplying unit configured to control the irradiation angle at which the intensity of light becomes the maximum to be an angle other than 0 degrees has been described with reference to FIG. 9. However, the structure of the backlight unit 40 is not limited to the structure illustrated in FIG. 9, and various modification examples can be applied so long as the peak angle can be controlled so as to be a predetermined angle other than 0 degrees.

<Modification Example>

Figure 10:
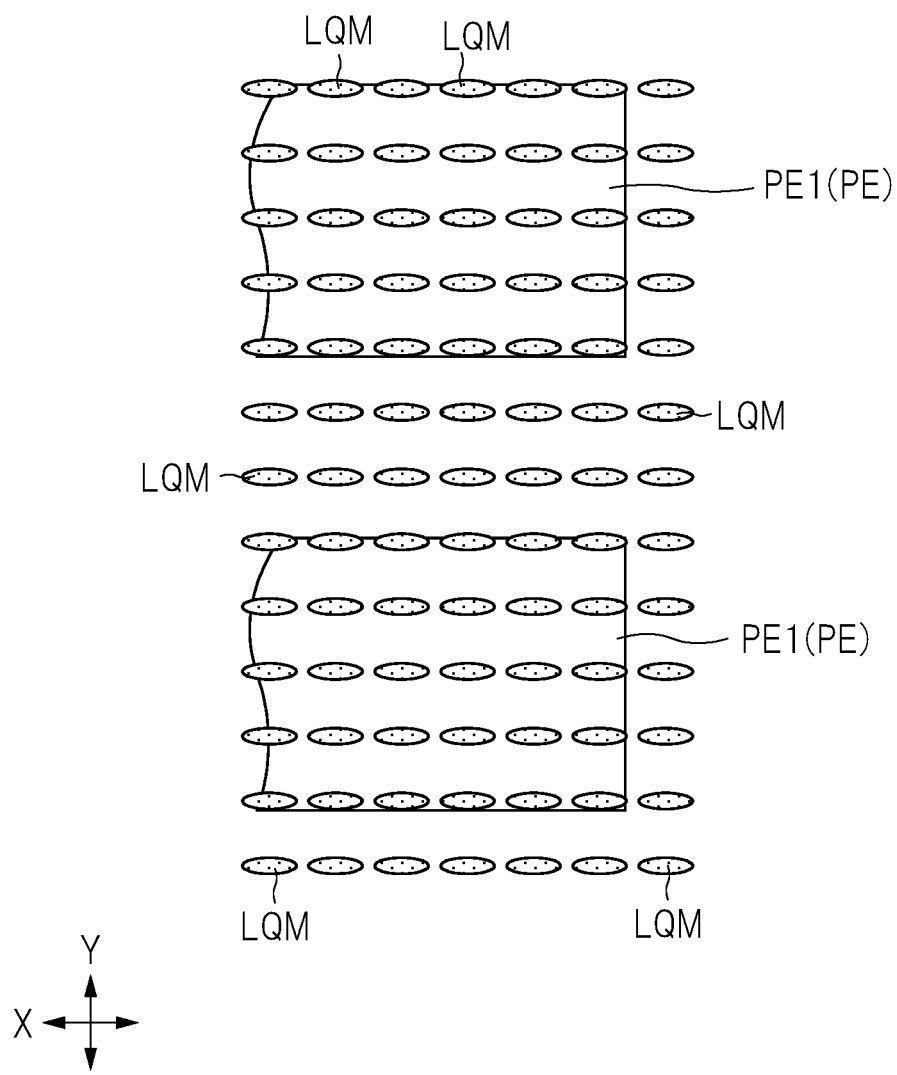
FIG. 10 is an enlarged plan view illustrating a state of initial orientation of liquid crystal molecules that are positive liquid crystals in a modification example with respect to FIG. 6.

As described above, the liquid crystal layer LQ illustrated in FIG. 4 can use the positive liquid crystals or the negative liquid crystals. FIG. 6 illustrated the example of the initial orientation in a case where the negative liquid crystals are used. FIG. 10 is an enlarged plan view illustrating a state of initial orientation of liquid crystal molecules that are positive liquid crystals in a modification example with respect to FIG. 6. As illustrated in FIG. 10, in a case where the liquid crystal layer LQ (see FIG. 4) are the positive liquid crystals, a direction of initial orientation of the liquid crystal molecules LQM becomes a direction (an X direction) in which branch electrodes PE1 extend. Further, a rotational direction of the liquid crystal molecules LQM that are the positive liquid crystals is similar to that of the negative liquid crystals. For this reason, in a case where the liquid crystal layer LQ is the positive liquid crystals, an orientation direction of the liquid crystal molecules LQM continuously changes in the X direction after a voltage is applied.

Further, in FIG. 4, the structure in which the pixel electrode PE is arranged at the position closer to the liquid crystal layer LQ than the common electrode CE has been taken up and described. However, as a modification example, the common electrode CE may be arranged at a position closer to the liquid crystal layer LQ than the pixel electrode PE. In this case, a shape of the common electrode CE becomes a comb-tooth shape provided with a plurality of branch electrodes PE1 as in the example illustrated in FIG. 5. On the other hand, the pixel electrode PE may be a simple structure in which each of the subpixels is patterned in an island shape.

Various modifications and alterations can be conceived by a person having ordinary skill in the art within the spirit of the present invention, and it is understood that such modifications and alterations are also encompassed within the scope of the present invention. For example, a person having ordinary skill in the art can suitably modify the above-described embodiment by addition, deletion, or design change of components, or by addition, omission, or condition change of steps. Such modifications are also encompassed within the scope of the present invention as long as they include the gist of the present invention.

INDUSTRIAL APPLICABILITY

The present invention can be used for an optical element and a liquid crystal display apparatus provided with the optical element.

What is claimed is:

1. A display apparatus comprising:
a display panel; and
a light supplying unit facing the display panel and configured to emit visible light to the display panel,
wherein the display panel includes a first polarizing plate, a first substrate, a liquid crystal layer, a second substrate, and a second polarizing plate, which are laminated on a facing surface of the light supplying unit with respect to the display panel,
wherein the first substrate has a first electrode and a second electrode formed on a layer different from that of the first electrode,
wherein in a plan view, the second electrode extends in a first direction and includes a plurality of branch electrodes arranged in a second direction orthogonal to the first direction,
wherein a transmission axis of the first polarizing plate and a transmission axis of the second polarizing plate are orthogonal to each other, and any one of the transmission axis of the first polarizing plate and the transmission axis of the second polarizing plate is parallel to an orientation direction of liquid crystal molecules when no voltage is applied to the second electrode,
wherein, when a formation surface of the second electrode is used as a base level and a normal direction of the base level is set to 0 degrees, light having a peak of intensity of light at an angle different from 0 degrees in a visible light region is emitted to the display panel from the light supplying unit,
wherein, when no voltage is applied to the second electrode, the light emitted from the normal direction of 0 degrees when viewed from the base level is not diffracted and is emitted in a direction of 180 degrees when viewed from the base level,
wherein, when voltage is applied to the second electrode, the light emitted from the normal direction of 0 degrees when viewed from the base level is diffracted and is emitted in any direction other than 180 degrees when viewed from the base level, and
wherein the intensity of light emitted in the direction of 180 degrees when voltage is applied to the second electrode when viewed from the base level becomes smaller than the intensity of light emitted in the direction of 180 degrees when no voltage is applied to the second electrode.

2. The display apparatus according to claim 1,
wherein the light supplied from the light supplying unit has peaks of the intensity of light at a plurality of angles other than 0 degrees in the visible light region.

3. The display apparatus according to claim 2,
wherein the plurality of branch electrodes of the second electrode is arranged at equal intervals in the second direction, and
wherein a pitch defined by a sum of a width of each of theplurality of branch electrodes and a clearance of branch electrodes adjacent to each other of the plurality of branch electrodes is 9 μm or shorter.

4. The display apparatus according to claim 3,
wherein the plurality of branch electrodes of the second electrode is arranged at equal intervals in the second direction, and
wherein a pitch defined by a sum of a width of each of the plurality of branch electrodes and a clearance of branch electrodes adjacent to each other of the plurality of branch electrodes is p, an irradiation angle when the intensity of light supplied from the light supplying unit becomes a peak is θ, and a wavelength of the visible light region is λ, then the irradiation angle is within a range where a formula "p×sin θ=λ" is established.

5. The display apparatus according to claim 2,
wherein the plurality of branch electrodes of the second electrode is arranged at equal intervals in the second direction, and
wherein a pitch defined by a sum of a width of each of the plurality of branch electrodes and a clearance of branch electrodes adjacent to each other of the plurality of branch electrodes is p, an irradiation angle when the intensity of light supplied from the light supplying unit becomes a peak is θ, and a wavelength of the visible light region is λ, then the irradiation angle is within a range where a formula "p×sin θ=λ" is established.

6. The display apparatus according to claim 2,
wherein the liquid crystal layer is a negative liquid crystal, and a direction of initial orientation of the liquid crystal molecules in the liquid crystal layer is the second direction.

7. The display apparatus according to claim 2,
wherein the liquid crystal layer is a positive liquid crystal, and a direction of initial orientation of the liquid crystal molecules in the liquid crystal layer is the first direction.

8. The display apparatus according to claim 2,
wherein the light supplying unit has a first light source, a second light source, a light guide plate, and a plurality of lenses,
wherein the light guide plate includes:
an emission surface configured to emit light, the emission surface facing the display panel via the plurality of lenses;
a reflecting surface located inside an opposite surface of the emission surface, the reflecting surface being configured to reflect light emitted from the first light source and the second light source;
a first side surface facing the first light source; and
a second side surface facing the second light source.

9. The display apparatus according to claim 1,
wherein the plurality of branch electrodes of the second electrode is arranged at equal intervals in the second direction, and
wherein a pitch defined by a sum of a width of each of the plurality of branch electrodes and a clearance of branch electrodes adjacent to each other of the plurality of branch electrodes is 9 μm or shorter.

10. The display apparatus according to claim 9,
wherein the plurality of branch electrodes of the second electrode is arranged at equal intervals in the second direction, and
wherein a pitch defined by a sum of a width of each of the plurality of branch electrodes and a clearance of branch electrodes adjacent to each other of the plurality of branch electrodes is p, an irradiation angle when the intensity of light supplied from the light supplying unit becomes a peak is θ, and a wavelength of the visible light region is λ, then the irradiation angle is within a range where a formula "p×sin θ=λ" is established.

11. The display apparatus according to claim 3,
wherein the liquid crystal layer is a negative liquid crystal, and a direction of initial orientation of the liquid crystal molecules in the liquid crystal layer is the second direction.

12. The display apparatus according to claim 9,
wherein the liquid crystal layer is a positive liquid crystal, and a direction of initial orientation of the liquid crystal molecules in the liquid crystal layer is the first direction.

13. The display apparatus according to claim 9,
wherein the light supplying unit has a first light source, a second light source, a light guide plate, and a plurality of lenses,
wherein the light guide plate includes:
an emission surface configured to emit light, the emission surface facing the display panel via the plurality of lenses;
a reflecting surface located inside an opposite surface of the emission surface, the reflecting surface being configured to reflect light emitted from the first light source and the second light source;
a first side surface facing the first light source; and
a second side surface facing the second light source.

14. The display apparatus according to claim 1,
wherein the plurality of branch electrodes of the second electrode is arranged at equal intervals in the second direction, and
wherein a pitch defined by a sum of a width of each of the plurality of branch electrodes and a clearance of branch electrodes adjacent to each other of the plurality of branch electrodes is p, an irradiation angle when the intensity of light supplied from the light supplying unit becomes a peak is θ, and a wavelength of the visible light region is λ, then the irradiation angle is within a range where a formula "p×sin θ=λ" is established.

15. The display apparatus according to claim 14,
wherein the liquid crystal layer is a negative liquid crystal, and a direction of initial orientation of the liquid crystal molecules in the liquid crystal layer is the second direction.

16. The display apparatus according to claim 14,
wherein the liquid crystal layer is a positive liquid crystal, and a direction of initial orientation of the liquid crystal molecules in the liquid crystal layer is the first direction.

17. The display apparatus according to claim 1,
wherein the liquid crystal layer is a negative liquid crystal, and a direction of initial orientation of the liquid crystal molecules in the liquid crystal layer is the second direction.

18. The display apparatus according to claim 1,
wherein the liquid crystal layer is a positive liquid crystal, and a direction of initial orientation of the liquid crystal molecules in the liquid crystal layer is the first direction.

19. The display apparatus according to claim 1,
wherein the light supplying unit has a first light source, a second light source, a light guide plate, and a plurality of lenses,
wherein the light guide plate includes:
an emission surface facing the display panel via the plurality of lenses and configured to emit light;
a reflecting surface located inside an opposite surface of the emission surface, the reflecting surface being configured to reflect light emitted from the first light source and the second light source;
a first side surface facing the first light source; and
a second side surface facing the second light source.

20. The display apparatus according to claim 19, wherein the light supplying unit is configured to supply the light in a state where both the first light source and the second light source are turned ON.

* * * * *